July 17, 1923.
H. H. BOYCE
WATER LEVEL INDICATOR FOR AUTOMOBILE RADIATORS
Filed March 29, 1916
1,461,722
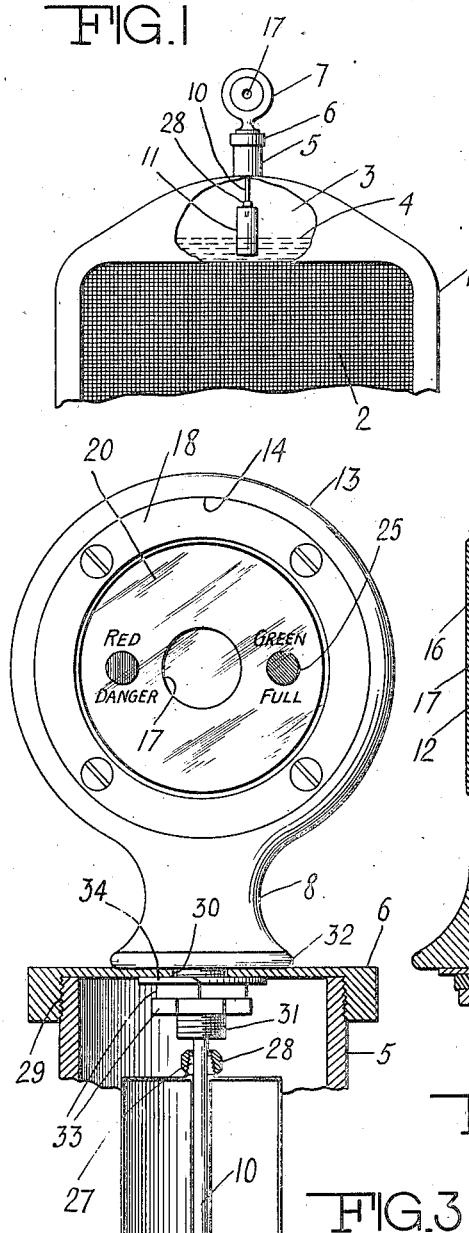
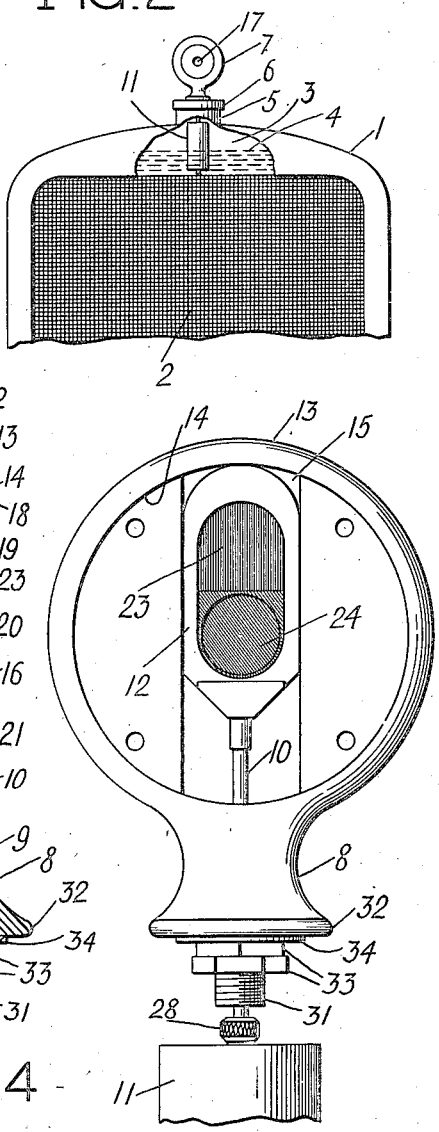
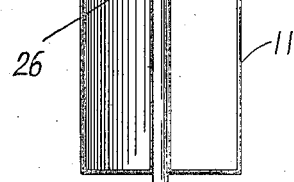
INVENTOR.
Harrison H Boyce
BY
ATTORNEY Patented July 17, 1923.

1,461,722

UNITED STATES PATENT OFFICE.

HARRISON H. BOYCE, OF FOREST HILLS, NEW YORK.

WATER-LEVEL INDICATOR FOR AUTOMOBILE RADIATORS.

Application filed March 29, 1916. Serial No. 87,422.

*To all whom it may concern:*

Be it known that I, HARRISON H. BOYCE, a citizen of the United States, residing in Forest Hills, county of Queens, city and State of New York, have invented certain new and useful Improvements in Water-Level Indicators for Automobile Radiators, of which the following is a specification.

At the present day, the great majority of automobiles are provided with internal combustion engines having water circulation cooling systems, including radiators. Unless the cooling system and the radiator are kept properly filled with water, the engine will overheat and serious injury to it may result. It is an object of the present invention to provide a simple and efficient device, which will at all times indicate to the operator of the car the height of the water in the radiator, and thereby enable him to avoid the danger of low water. Another object of the invention is to provide a device of this character in which a distinctive danger signal will be produced in case the water in the radiator falls below its normal level. Another object of this invention is to provide a device of this character, adapted to be conveniently positioned upon the filler cap of the radiator, where it can be observed from the driver's seat. Another object of the invention is to provide an indicator which can be so mounted upon a screw radiator cap that it can be readily adjusted to proper position, after the cap is screwed on the filler spout. Another object of the invention is to provide an indicator which can be read at night, as well as by day. Another object of the invention is to provide a device of the character described, which can be adjusted to suit radiators having different amounts of free space at the tops thereof, or having different normal water levels.

The nature of the invention and additional objects thereof, will appear from the following detailed description of one preferred embodiment of my invention.

In the accompanying drawings, which form a part of this specification and which illustrate such preferred embodiment, Figure 1 is a front elevation of the upper portion of an automobile radiator, parts being broken away, and having a water level indicator mounted thereon. Figure 2 is a similar figure, showing my indicator mounted on a radiator having a smaller free space in the upper part thereof, and having a higher normal water level. Figure 3 is a detailed front elevation of the indicator, the float being shown in section. Figure 4 is a vertical central sectional view through the indicator. Figure 5 is a view of the indicator with the dial, crystal and crystal retaining ring removed.

Referring to the drawings in detail, 1 designates an automobile radiator, which may be of any usual construction, and is shown as being provided with the usual tubular radiating section 2. It is customary in radiators to have above the tubes a chamber or tank space 3, which is normally partly full of water as indicated at 4, and into which the return pipe from the engine (not shown) discharges. Mounted on top of the radiator is the usual filler spout 5, closed by the cap 6, which may be screwed to the threaded upper end of the filler spout or otherwise secured in place. 7 is the water level indicator, which is preferably attached to the filler cap, and which is lifted from the radiator when the filler cap is removed to permit the radiator to be filled.

The water level indicator, in the particular form illustrated, comprises a frame 8, mounted on the filler cap and having in it a vertical aperture 9, through which slides a rod or stem 10. The latter carries at its lower end a float 11, the position of which will be determined by the water level, while at the upper end of the rod is a target 12, which indicates the position of the float and consequently the level of the water. The frame 8 may be of any suitable construction, it preferably having a disc-shaped head portion 13, having circular recesses 14 in each side thereof and having a deeper vertical central recess 15, in which slides the target 12. Mounted in the circular recesses 14, one upon each side of the target, are the dial plates 16, each of which is provided with an aperture 17, the two apertures being arranged in alignment and preferably centrally located. Mounted in each of the recesses 14, outside of the dial plates, are the crystal carrying rings 18, each of which is provided with an undercut recess 19, which receives the edge of a crystal 20. The crystals may be held in the rings in any desired manner, as by the retaining wires 21. The target comprises, as illustrated, a frame having a vertical slot 22 extending across the same, suitable transparent colored plates of celluloid or other suitable material being mounted in this slot. As illustrated two of such colored plates are employed, the upper one 23 being of one color, red for instance, while the lower plate 24 is of a contrasting color, such as green. These plates need not necessarily be transparent, but it is desirable that they be so made, as it is then possible to look right through the apertures 17 and the plate, making the color of the latter stand out prominently, and so rendering the instrument very easy to read. In fact, with this construction it is possible to read the instrument at night, as the color will be brought out against the beam of light thrown by the headlights of the car. If desired, small colored reference discs may be secured to one or both of the dials, as indicated at 25 in Figure 3, these being accompanied by suitable legends explanatory of what the different colors indicate. Thus, in the construction described, when the color visible through the aperture 17 is red as will be the case when the red plate 23 is located in line with the aperture, it shows that the water level is below normal and, that a condition of danger, or at least one requiring the attention of the operator is imminent, while, when the aperture shows green it indicates that the radiator is properly filled. Of course, when parts of both plates show, the height of the water can be easily judged.

The float 11 and the rod or stem 10 having an indicator portion, in this instance, the target 12, comprise what may appropriately be styled a movable element. Suitable means should, of course, be provided whereby the indicator portion of the rod or stem is maintained in proper position in its exposed movement and in protected position relative to the frame. To this end, in the present instance, the movable element is guided and limited in its movement by the bearing of the rod or stem within the apertured portion 9 of the frame, the walls of the recessed portion 15, and the top of the head portion 13.

The float 11 is preferably so arranged as to be adjustable so as to adapt the instrument for use in radiators having varying amounts of space above the tubes and having different normal water levels. As illustrated, this result is accomplished by mounting the float adjustably upon the rod 10, the float being provided with a central sleeve 26, which makes it watertight, but which will slide freely upon the rod. The float may be clamped to the rod in any suitable manner by the split screwed threaded nipple 27, projecting from its upper end, upon which screws the nut 28. By screwing the nut down upon the nipple, it will be seen that the parts will be caused to clamp the rod, thereby securing the float in the desired adjusted position. The rod 10 is preferably made of such length that when the float is at the upper limit of its adjustment, the instrument will fit a radiator having a shallow water chamber, as indicated in Figure 2. When the chamber is deep, however, and the water level relatively low, as indicated in Figure 1, it will be seen that the float can be slid down until nearly off the rod, only so much of the rod projecting into the top of the sleeve of the float as is necessary to hold the float steady, and to permit the parts of the nipple to be firmly clamped upon the rod.

The instrument is preferably secured to the radiator cap in such a way that its position can be rectified after the cap is attached to the filler spout. The common way of attaching radiator caps is to provide the upper end of the filler spout with a screw thread 29, as indicated in Figure 3, and screw the cap thereon. As will be readily appreciated with such a construction, the cap will rarely be screwed each time to the same position. In other words, sometimes the cap will be rotated a little further than at other times, and if the instrument were mounted rigidly upon the cap its face, of course, would not always be squarely presented to the operator's view, which would make it difficult to read and also unsightly. I accordingly attach the instrument to the radiator cap frictionally, so that after the cap is screwed down, the instrument may be turned as may be needed to bring its plane at right angles to the axis of the car. This result may be secured in any desired manner as by making a hole 30 in the top of the radiator cap of sufficient size for the screw threaded neck 31 on the bottom of the instrument frame to project freely therethrough. The instrument frame has a shoulder 32, which rests upon the top of the radiator cap, while a nut or nuts 33, are screwed on the neck on the underside of the cap. A spring washer 34 is preferably interposed between the nuts and the underside of the cap, this washer serving the double purpose of a lock washer and a friction member engaging with the cap. With this construction it will be seen that while the instrument is firmly held upon the cap, its angular position may be adjusted with relation thereto.

While I have shown and described in detail but one form of my invention, it is to be understood that this form is merely illustrative of the best mode now known to me for applying said invention. I do not, therefore, intend to limit myself to such specific form, but desire to cover the principle of my invention broadly in any form in which it may be embodied.

Having thus described my invention, what I claim as new, and desire to secure by Letters Patent, is:

1. A water level indicator for automobile radiators comprising a frame having at its opposite faces portions through which the interior of the casing is exposed to view and adapted to be mounted upon a radiator cap, a target having a limited movement within said frame and observable from both faces thereof, a float adapted to be inserted thru the filling neck of a radiator, and means operatively connecting said float and said target.

2. Means for indicating to the driver of an automobile the level of the cooling water within the radiator thereof comprising the combination with the radiator of a float therein, a frame mounted upon the radiator cap having a sight opening intermediate the upper and lower portions thereof, and in the direction of vision of the driver, and indicating means within said frame operatively connected to said float and movable therewith, said indicating means including a distinctive portion normally concealed from view by said frame and adapted to be moved into position to be seen through said opening when the water level changes.

3. Means for indicating to the driver of an automobile the level of the cooling water within the radiator thereof comprising the combination with the radiator of a float within the radiator, a frame mounted on the radiator cap having an opening therethrough intermediate the upper and lower portions of the frame and arranged in the direction of vision from the driver's seat and a movable transparent colored portion in said frame adapted to be concealed thereby or to be viewed through said opening and operatively connected with said float.

4. Means for indicating to the driver of a vehicle the level of the water within the radiator thereof comprising the combination with the radiator of an indicating device having an indicating part mounted on the radiator cap and visible from the driver's seat and means for operating said indicating part including a float located in the top tank of the radiator above the radiator tubes and an adjustable connection between said indicating part and said float permitting the normal position of said float to be varied, said float being of such shape that it may be introduced into and removed from the radiator through the filler opening thereof.

5. Means for indicating to the driver of a vehicle the level of the water within the radiator thereof comprising the combination with the radiator of an indicating device having an indicating part mounted on the radiator cap and visible from the driver's seat and means for operating said indicating part including a rod projecting into the top tank of the radiator and terminating above the level of the radiator tubes and a float adjustably mounted on said rod and provided with means at its upper end only for securing it to said rod whereby said float is capable of being secured to said rod in such a position that the lower part of the float projects substantially below the lower end of the rod.

6. A water level indicator for automobile radiators including a support, a stem movably mounted on said support and depending into the radiator, an indicating element mounted on said stem outside of said radiator, a float adjustably mounted on the depending portion of said stem and clamping means located on the upper part of said float for attaching the float to the stem, said float having an opening therein adapted to receive the stem whereby the float may be clamped to the stem either in an upper position in which the stem projects through the float or in a lower position in which the main part of the float depends below the stem or in an intermediate position.

7. In a water level indicator for automobile radiators, a support, a stem movably mounted therein and having a portion depending into said radiator, an indicating element mounted on said stem outside of said radiator, and a float adjustably mounted on said stem inside of said radiator, said float having a central sleeve enclosing said stem and having a split screw threaded nipple and nut at the upper end of said sleeve for clamping the same in adjusted position upon said stem.

8. In combination with an automobile radiator having a radiating section above which is a tank space, and having a filler spout and a cap cooperating therewith, a water level indicator comprising a frame adapted to be mounted upon said radiator cap, a target having a movement limited by said frame, a float adapted to be inserted thru the filler spout into said tank space above the radiator section to be influenced by water in the tank space, and means operatively connecting said float and said target.

9. A water level indicator for automobile radiators comprising a movable element consisting of a float, a rod connected with said float and provided with a part to constitute an indicator portion, and a surrounding protective frame provided with a face portion thru which the indicator portion is exposed to view, the frame being adapted to be mounted on a radiator cap for housing said indicator, and means for guiding and limiting the movement of the movable element as the indicator portion shifts relative to that portion of the face thru which the same may be viewed, said guiding means and indicator portion being related and arranged to position the indicator portion, throughout its path of exposed movement, inwardly beyond the plane of the protecting face of the frame.

HARRISON H. BOYCE.